Patented Apr. 12, 1938

2,113,625

UNITED STATES PATENT OFFICE 2,113,625

SPRAY MATERIAL

John Monteith, Jr., Washington, D. C.; dedicated to the free use of the People of the United States No Drawing. Application September 24, 1936, Serial No. 102,401

1 Claim. (Cl. 8—6)

(Granted under the act of March 3, 1883, as amended April 30, 1928; 370 O. G. 757)

This application is made under the act of March 3, 1883, as amended by the act of April 30, 1928, and the invention herein described and claimed may be manufactured and used by or for the Government for governmental purposes without the payment to me of any royalty thereon.

I hereby dedicate the invention herein described to the free use of the People of the United States, to take effect on the granting of a patent to me.

My invention relates to the use of aniline dyes for application to plants, particularly turf grasses, in liquid spray, for enhancing the appearance of the foliage and simultaneously preventing parasitic diseases.

I am aware of the use of certain aniline dyes in conjunction with wetting agents, but this treatment is entirely outside the purview of my invention as to objectives, materials and selective action.

The primary object of my invention is to supply an organic dyeing material for plants adapted to control their color in the natural tint throughout all seasons of the year.

Another objective is to prevent discoloration of turf grasses by inhibiting fungus and bacterial diseases.

A further object of my invention is provide a coloring material which may be applied to grass, or other vegetation, to give it the appearance of a healthy vegetation at a time when it is discolored due to malnutrition or injuries in addition to those caused by fungus diseases.

A still further object of my invention is to provide a color which may be combined with other spray materials, such as arsenate of lead or calcium arsenate, thereby masking the objectionable appearance of these materials when they are deposited upon the foliage.

Field tests have demonstrated that the use of selected organic dyestuffs, or mixtures thereof, according to my invention hereinafter described, have been positively effective in imparting to various types of grasses the appearance of natural color throughout all seasons of the year. I have found also that the dyestuffs, or mixtures thereof, hereinafter described, are instrumental in preventing and/or inhibiting the growth and spread of fungus diseases such as brownpatch, dollarspot and spotblight of turf. Because the preferred dyestuffs are nontoxic to the plants and grasses and do not leave residues harmful to man or animals, they are particularly useful in the treatment of turf.

In general, I have found that green dyestuffs of the diphenylmethane and triphenylmethane classes are very effective in the treatment of plants and turf grasses according to my invention. Other water soluble green dyestuffs may, however, also be used with considerable success.

It is highly desirable to have a dyestuff which will maintain the appearance of natural, healthy color for use on golf and bowling greens and other fine turf throughout unfavorable weather for growth or other times when injuries occur.

The use of my invention in no way complicates the general procedure of spray application. Although I am not restricting myself to the variations of the proportions of the ingredients needed to match various colors of plants, the most common formula I recommend to be used as a liquid spray, by way of illustration, contains the following:

*Example 1.*—Malachite green, 5 ounces; Auramine O, 5 ounces; crystal violet, $\frac{1}{16}$ ounce; water, 50 gallons. Fill up the spray tank, add the individual dyes or a mixture of the dyes to the water in the spray tank, and agitate the spray for a few minutes until the dyes are entirely dissolved. This amount is designed to cover ten thousand square feet of turf. This color has been found to match that of dark green turf.

*Example 2.*—Malachite green, 2 ounces; Auramine O, 2 ounces; water, 50 gallons. This spray has been found to match the color of pale or yellowish green turf. It is applied as described above in Example 1 for the purpose of enhancing the appearance of the turf.

Inorganic and organic insecticides and fungicides may be added to the above mentioned mixtures as may be desired without reduction in the efficiency of either. Various stickers or spreaders may also be used to provide a more uniform distribution of these materials on the foliage.

Having thus described my invention, what I claim for Letters Patent is:

A spray material adapted for controlling the coloring of plants comprising as its essential active ingredients substantially 5 ounces Malachite green; Auramine O, 5 ounces; crystal violet, $\frac{1}{16}$ ounce; approximately 50 gallons of water.

JOHN MONTEITH, Jr.